(12) United States Patent
Troiano et al.

(10) Patent No.: US 10,169,887 B2
(45) Date of Patent: Jan. 1, 2019

(54) ACCELERATED BLITS OF MULTISAMPLED TEXTURES ON GPUS

(71) Applicant: Apple Inc., Cupertino, CA (US)

(72) Inventors: Domenico Troiano, Cupertino, CA (US); Michael Imbrogno, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 15/179,738

(22) Filed: Jun. 10, 2016

(65) Prior Publication Data

US 2017/0358109 A1    Dec. 14, 2017

(51) Int. Cl.
*G06T 11/00*    (2006.01)
*G06T 1/60*    (2006.01)
*G06T 15/04*    (2011.01)

(52) U.S. Cl.
CPC .............. *G06T 11/001* (2013.01); *G06T 1/60* (2013.01); *G06T 15/04* (2013.01)

(58) Field of Classification Search
CPC ........... G06T 15/005; G06T 1/20; G06T 1/60; G06T 2200/28; G06T 11/40; G06T 15/30; G06T 15/04; G06T 15/503; G06T 2210/12; G06T 2210/36; G06T 3/4053; G06T 11/001; G06T 15/40; G09G 5/363
See application file for complete search history.

(56) References Cited

U.S. PATENT DOCUMENTS

| 6,683,615 B1 | 1/2004 | Baldwin | |
| 2008/0094406 A1* | 4/2008 | Weese | G06T 1/60 |
| | | | 345/544 |
| 2012/0013624 A1* | 1/2012 | Fowler | G06T 1/60 |
| | | | 345/520 |
| 2013/0141445 A1 | 6/2013 | Engh-Halstvedt | |
| 2015/0062154 A1 | 3/2015 | Ellis | |

\* cited by examiner

*Primary Examiner* — Maurice L. McDowell, Jr.
(74) *Attorney, Agent, or Firm* — Blank Rome LLP

(57) ABSTRACT

Systems, computer readable media, and methods for hardware accelerated blits of multisampled textures on graphics processing units (GPUs) are disclosed. For multisampled surfaces, texture-to-buffer blits cannot be trivially implemented because most GPUs do not support writing multisampled surfaces with a linear memory layout. Moreover, GPUs often have a maximum limit for row stride (i.e., the number of bytes from one row of pixels in memory to the next) and/or texture size. When the destination buffer for the blit of a multisampled texture is too large to be aliased by an equivalent non-multisampled texture view, the stride of the view has no spatial relationship with the destination buffer. Thus, to access the source texture correctly, a 'remapping' may be performed to determine the linear sample index of a fragment within the view, and the destination buffer stride may be used to compute the texture coordinates used to sample the source texture.

20 Claims, 11 Drawing Sheets

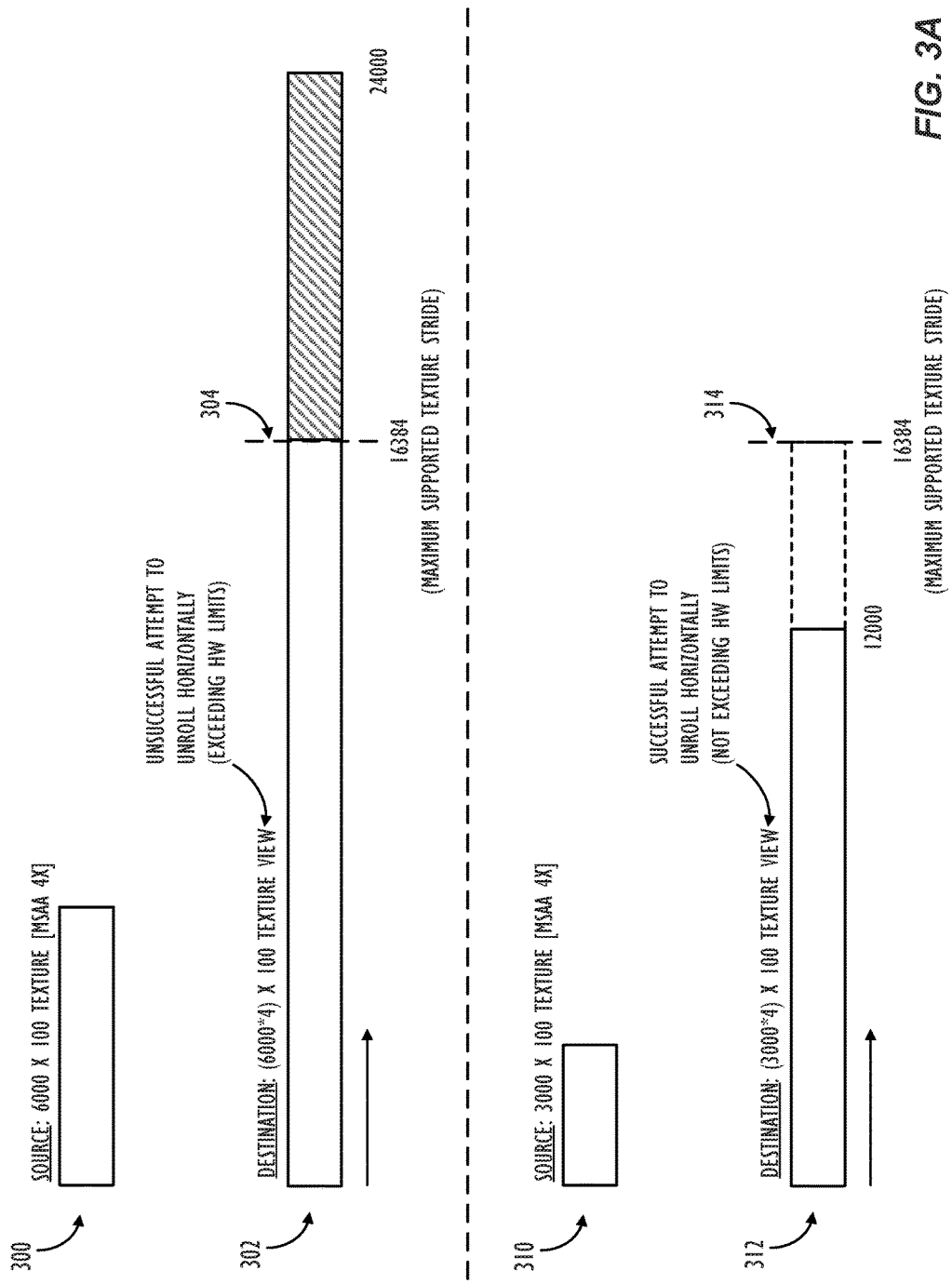

ACCELERATED BLITS OF MULTISAMPLED TEXTURES ON GPUS

TECHNICAL FIELD

This disclosure relates generally to the field of computer programming. More particularly, but not by way of limitation, it relates to techniques for performing blit operations on multisampled textures using graphics processing units (GPUs).

BACKGROUND

Computers and other computational devices typically have at least one programmable processing element that is generally known as a central processing unit (CPU). Such devices frequently also have other programmable processors that are used for specialized processing tasks of various types, such as graphics processing operations, and hence are typically called graphics processing units (GPUs). GPUs generally comprise multiple cores or processing elements designed for executing the same instruction on parallel data streams, making them more effective than general-purpose CPUs for algorithms in which processing of large blocks of data is done in parallel. In general, a CPU may function as a "host," i.e., setting up specialized parallel tasks and then handing them off to be performed by one or more GPUs.

Although GPUs were originally developed for rendering graphics and remain heavily used for that purpose, current GPUs support a programming paradigm that allows for the use of GPUs as general-purpose parallel processing units, i.e., in addition to being used as graphics processors. This paradigm allows implementation of algorithms unrelated to rendering graphics by giving access to GPU computing hardware in a more generic, non-graphics-oriented way.

Several frameworks have been developed for heterogeneous computing platforms that have CPUs and GPUs. These frameworks include the METAL framework from Apple Inc., although other frameworks are in use in the industry (METAL is a trademark of APPLE INC.). Some frameworks focus on using the GPU for general computing tasks, allowing any application to use the GPUs' parallel processing functionality for more than graphics applications. Other frameworks focus on using the GPU for graphics processing and provides application programmer interfaces (APIs) for rendering two-dimensional (2D) and three-dimensional (3D) graphics. The METAL framework supports GPU-accelerated advanced 3D graphics rendering and data-parallel computation workloads.

Various tasks may be offloaded from a host (e.g., CPU) to any available GPU in the computer system. One type of task, in particular, that may be performed by GPUs is known as a "blit" operation. The term blit refers to the operation of copying a region of a texture object onto another texture of the same format or from/to a memory buffer. As described herein, blit operations may be performed entirely by a GPU, with a minimum setup cost on CPU. Some frameworks support the following kinds of blit operations: texture-to-texture; texture-to-buffer; and buffer-to-texture.

Buffer objects, as described herein, are handled internally by the graphics hardware as textures with a one-dimensional, i.e., linear, memory layout. The GPU drivers may thus create a "texture view" of the buffer that is compatible with the size of the blit range requested by a developer and/or calling application, which allows the GPU to implement texture-to-buffer and buffer-to-texture blit operations as texture-to-texture blits.

For non-multisampled textures (i.e., textures wherein only a single color sample is stored per pixel), one or more GPU drivers may simply set up the GPU to implement the texture-to-texture blit operation as a fragment shader program that reads in from the source texture and writes out to the destination texture. For texture-to-buffer blits, the destination texture may be thought of as an alias of a linear buffer.

For multisampled textures (i.e., textures wherein more than one color sample is stored per pixel), however, texture-to-buffer blits may not presently be implemented as mentioned above with reference to non-multisampled textures, e.g., because present GPUs do not support writing multisampled surfaces with a linear memory layout. Moreover, because of various hardware limitations, it is not presently possible to implement buffer-to-(multisampled) texture blits with this approach either.

Thus, techniques are needed to handle certain situations, e.g., blits of multisampled textures, wherein the destination buffers are too large to be aliased by an equivalent non-multisampled texture view. Appropriately handling such situations on the GPU will allow developers and/or calling applications to seamlessly execute texture-to-buffer blit copy operations on large, multisampled textures. Such techniques are also preferably computationally efficient and respect the developer's use of padding in source textures.

GLOSSARY

The following terms used herein are defined and explained as follows:

"Blit": The term blit refers to the operation of copying a region of a texture object (i.e., data stored at a particular location in memory) onto another texture of the same format or from/to a memory buffer (i.e., to a different location in memory). As described herein, blit operations are performed by one or more GPUs, with only minimum setup costs incurred by a CPU.

"Memory buffer" or "Linear buffer": These terms, as used herein, refer to a region of unformatted memory accessible by the GPU.

"Memory layout": The order by which the pixels comprising a texture or buffer object are physically laid out in memory.

"Linear layout": A memory layout wherein the pixel data is stored in row-major order, i.e., from top-to-bottom, and left-to-right in a contiguous fashion. [To the extent there are 'padding' (i.e., unused) pixels between consecutive rows in the layout after the last pixel containing "real" data, the layout may be considered 'non-contiguous,' least with respect to the insertion of the padding pixels between rows.]

"Twiddled layout": A memory layout wherein the pixel data is stored in a particular (i.e., non-linear) fashion that is vendor and/or implementation specific, and which is often aimed at improving the performance of memory accesses. Examples of twiddled layouts include: the "N," "backwards N," "Z," and "backwards Z" layouts.

"Multisampled": The term multisampled refers to a texture object in which more than one color value is stored per pixel. In this context, each individual color value is referred to as a "sample." Such technique is also called "multisampling anti-aliasing," or "MSAA." E.g.: an "MSAA 4×" texture is a texture that contains four different samples per pixel. In multisample anti-aliasing, if any of the multi sample locations in a pixel is covered by a triangle that is being rendered, a shading computation must be performed for that triangle. However, this calculation only needs to be performed once for the whole pixel regardless of how many sample positions are covered. The result of the shading calculation may then be applied to all of the relevant multi sample locations.

"Texture view": The term texture view, as used herein, refers to the reinterpretation of a portion of memory as a 'two-dimensional' texture object. For instance, a texture view of a 'one-dimensional' buffer range is a texture object that uses the memory of the original buffer object as if it was texture data. As the texture view is only a reinterpretation process, there is no data conversion required to take place on either the GPU or the CPU. Creating a texture view requires only a very small CPU cost for the setup. In other embodiments, texture views may support other dimensionalities as well, e.g., 1D, 3D, arrays, cubemaps, etc.

"Stride" or "Row stride": The term stride refers to the number of bytes between the beginning of a row of pixels and the beginning of the subsequent row of pixels in a linear memory layout. This number can be larger than the size of a row of pixels. Row stride may also be expressed in terms of a number of pixels and/or samples (rather than a number of bytes), if it is understood how many bytes-per-pixel or bytes-per-sample are being used in a given instance.

"Stride padding" or "Padding": The term stride padding measures the difference between the stride and the size of a row in bytes. For example, given a 28×16 texture with RGBA8 format (i.e., 1 byte each of Red, Green, Blue, and Alpha (transparency) data for each pixel, for a total of 4 bytes per pixel), the size of a row of pixels is 28×4=112 bytes. If the stride of such texture is known to be 128 bytes, then the stride padding would refer to the number of bytes between the end of the last pixel of a given row and the beginning of the first pixel of the following row, i.e., 128-112, or 16 bytes, in this case.

"Discard": The term discard in the context of a pixel or fragment shader refers to the capability of not outputting the color/depth related to the fragment being shaded.

SUMMARY

In one embodiment, the disclosed concepts provide a method to perform texture-to-texture copy operations—as well as texture-to-buffer copy operations—for multisampled textures on a GPU. In particular, when a multisampled texture is copied to a one-dimensional buffer range in memory, it may be reinterpreted as a two-dimensional texture view, i.e., a texture object that uses the memory of the original buffer object as if it was texture data, that aliases the buffer itself.

In order handle texture-to-buffer copy operations for certain large multisampled textures (e.g., so-called "MSAA 4×" textures that contain four different samples for each pixel), GPU drivers according to some embodiments may first attempt various 'reinterpretations' of the MSAA 4× texture so that the GPU is able to handle all of the texture information in a buffer. For example, the GPU drivers may instruct the GPU to interpret the MSAA 4× source texture as an equivalent MSAA 1×(i.e., non-MSAA) texture that is four times wider than the source texture. However, this reinterpretation may break down when the 'unrolling' of the MSAA 4× texture to four times its original width exceeds the maximum texture width supported by the GPU.

Because of the size of certain large multisampled textures (e.g., "MSAA 4×" textures), when all of the samples for each of the pixels in a row of the MSAA 4× source texture are unrolled, they may need to expand both horizontally and/or vertically in the destination texture view, meaning that sample information from a single row of pixels in the MSAA 4× source texture may end up spread over multiple "rows" in the destination texture view—thus destroying the spatial relationship between the location of pixels in the source texture and their location in the destination texture view. For example, pixels along the left-hand edge of the source texture may not end up along the left-hand edge of the destination texture view once all the multiple samples from each pixel have been unrolled (horizontally and/or vertically) into the destination buffer.

Thus, a remapping algorithm, as disclosed herein, may be employed to map between the coordinates of a given pixel sample in the destination texture view and the corresponding pixel sample in the source texture. In some embodiments, the remapping algorithm may also take into account the presence of padding pixels in the source textures, i.e., discarding fragment shading operations upon pixels in the destination texture view that are determined to be located in a padding region of the source texture. The disclosed techniques thus allow developers and/or calling applications to utilize one or more GPUs to seamlessly execute texture-to-buffer blit copy operations on large, multisampled textures.

In other embodiments, a computer executable program to implement the methods outlined above may be stored in any media that is readable and executable by a computer system. In still other embodiments, a programmable electronic device is disclosed with one or more processors programmed to perform the methods outlined above.

BRIEF DESCRIPTION OF THE DRAWINGS

FIG. 3A illustrates an attempt to unroll a multisampled source texture horizontally into a texture view of a destination buffer, in accordance with one or more embodiments.

DETAILED DESCRIPTION

This disclosure pertains to systems, computer readable media, and methods for hardware accelerated blits of multisampled textures on graphics processing units (GPUs). For multisampled surfaces, texture-to-buffer blits cannot be trivially implemented because most GPUs do not support writing multisampled surfaces with a linear memory layout. Moreover, GPUs often have a maximum limit for row stride (i.e., the number of bytes from one row of pixels in memory to the next) and/or texture size. When the destination buffer for the blit of a multisampled texture is too large to be aliased by an equivalent non-multisampled texture view, the stride of the view has no spatial relationship with the destination buffer. Thus, to access the source texture correctly, a 'remapping' may be performed to determine the linear sample index of a fragment within the view, and the destination buffer stride may be used to compute the texture coordinates used to sample the source texture.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Figure 1:
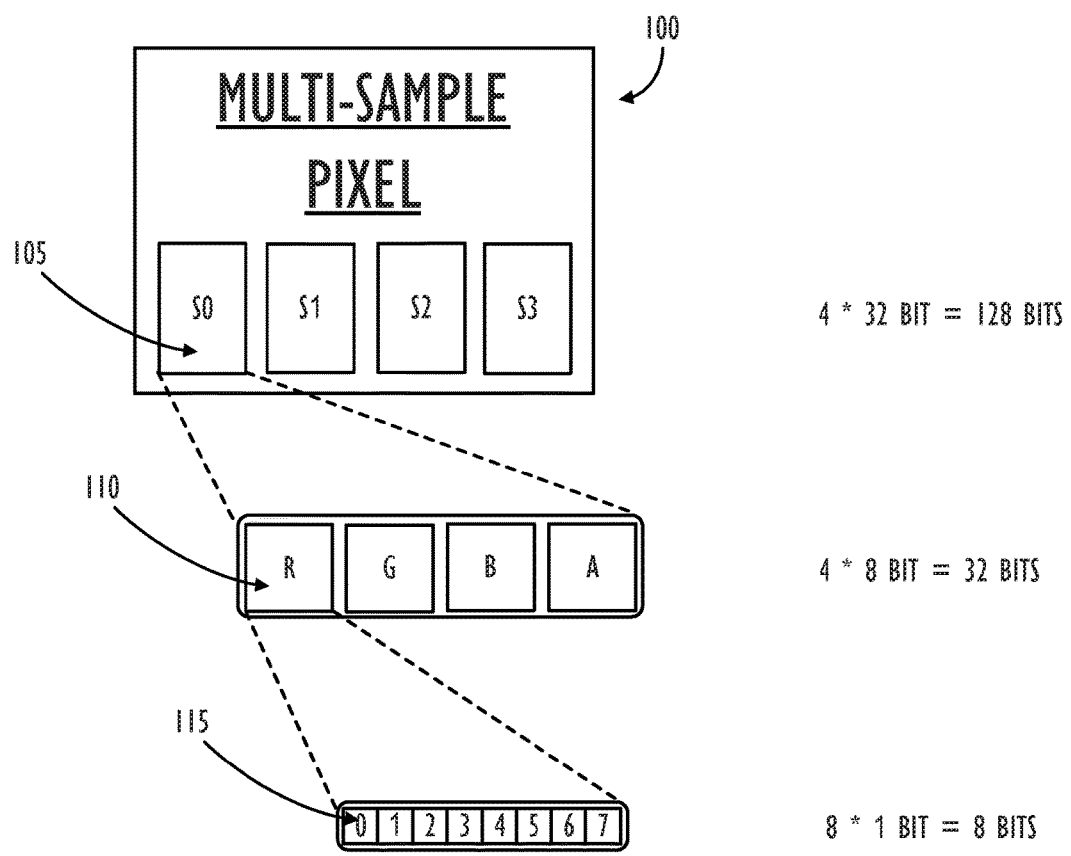
FIG. 1 illustrates the contents of an exemplary multisampled pixel, in accordance with one or more embodiments.

Referring now to FIG. 1, the contents of an exemplary multisampled pixel 100 are illustrated, in accordance with one or more embodiments. In particular, multisampled pixel 100 in this example is a 4× multisampled pixel, i.e., it contains four separate samples 105, labeled S0-S3. In this example, each sample is in the RGBA8 format, i.e., each sample comprises a Red, Green, Blue, and Alpha value 110 that has an 8-bit depth 115. Of course, other pixel formats may be used, and the use of RGBA8 herein is purely exemplary. Moving from the bottom of FIG. 1 to the top, each value 110 is comprised of 8 individual bits, for 8 bits (or 1 byte) total. Then, each sample 105 is comprised of 4 individual values, for 32 bits total. Finally, each multisampled pixel 100 is comprised of 4 individual samples of 32 bits each, for 128 bits total. As will be explained herein, certain graphics hardware is not capable of handling blit copy operations of multisampled textures to memory buffers (and vice versa), so the individual samples making up each pixel must be 'unrolled' and remapped in an intelligent fashion to ensure that the memory from the multisampled source texture is copied to the correct locations in the destination memory buffer.

Figure 2:
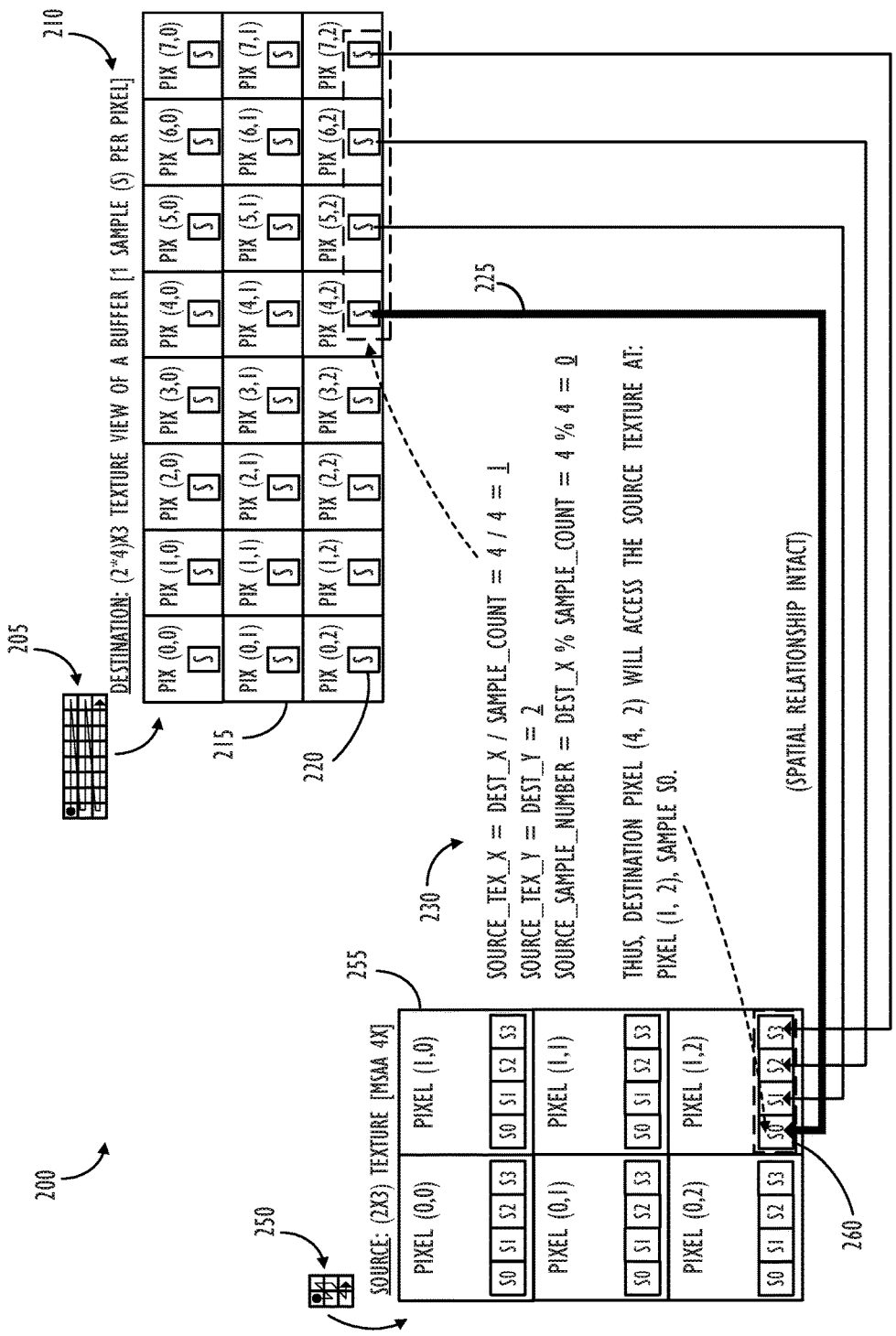
FIG. 2 illustrates the spatial relationship between a multisampled source texture and a texture view of a destination buffer, in accordance with one or more embodiments.

Referring now to FIG. 2, the spatial relationship 200 between a multisampled source texture 255 and a texture view of a destination buffer 210 is illustrated, in accordance with one or more embodiments. As mentioned above, buffer objects are handled internally by the graphics hardware with a linear memory layout. The GPU drivers may then create a "texture view" of the buffer that is compatible with the size of the blit region requested by a developer and/or calling application, which allows the GPU to implement texture-to-buffer and buffer-to-texture blit operations as texture-to-texture blits, as will be described in further detail herein.

In the example of FIG. 2, the multisampled source texture 255 represents a 2×3 MSAA 4× texture (i.e., a texture comprising two columns and three rows of pixels, wherein each pixel possess 4 samples 260, labeled S0-S3). Icon 250 indicates that the source pixels are laid out in memory according to a "twiddled layout" pattern. In this case, a 'backwards N' pattern is used to organize the way in which the two-dimensional pixel structure is 'walked' through when storing the pixels in the one-dimensional memory space. As mentioned above, the use of twiddled layouts is usually done to improve memory access performance (e.g., making it more likely that pixels that need to be accessed are already accessible in fast access memory cache). While most GPUs will support twiddled and linear layouts for non-multisampled textures, multisampled textures typically only support a twiddled layout, due to the fundamental assumption that the developer's main goals when using multisampled textures will be sampling and rendering performance—for which twiddled layouts are more favorable.

According to some embodiments, the twiddled layout itself is not exposed to developers, e.g., to avoid potential confusion and/or unintentional consequences stemming from the difficulty in addressing the desired pixels. Thus, according to some embodiments, for blit operations to work properly for MSAA textures, the GPU needs to be able to copy from and copy to memory that is in a linear layout. Therefore, on the execution of a memory copy operation is when the GPU may actually do the work to lay out the pixels of an input source texture in the optimized, i.e., twiddled, layout fashion.

In the example of FIG. 2, the texture view of a destination buffer 210 represents a (2*4)×3 destination texture view of a linear memory buffer (i.e., a texture view comprising eight columns (representing all 4 samples 220 for each of the 2 pixels in the corresponding row of the source texture 255) and three rows 215, also each corresponding to the three rows of the source texture 255). Icon 205 indicates that the destination buffer is laid out in memory according to a "linear" pattern (i.e., from left-to-right and top-to-bottom). In this case, the four samples (S0-S3) for Source Pixel (0,0) are stored as four consecutive individual samples in the destination buffer (labeled PIX (0,0) through PIX (3,0), followed by the four samples (S0-S3) for Source Pixel (1,0), which are labeled in the destination buffer as PIX (4,0) through PIX (7,0). This, "unrolling" process is then repeated in the additional rows 215 of the destination buffer 210 texture view.

Because the row stride of the destination buffer 210 texture view in this example is large enough to fit every sample for every pixel in the corresponding row of the source texture, the spatial relationship 225 between the source texture 255 and the destination buffer 210 texture view remains intact. As shown by arrow 225, the samples reflecting Pixel (1,2) in the source texture 255, which corresponds to the bottom-most and right-most pixel in the source texture, are also located at the bottom-most and right-most corner of the destination buffer 210 texture view (i.e., at PIX (4,2) through PIX (7,2)).

According to some embodiments, remapping equations 230 may be used to map between the fragment shader pixel locations corresponding to the destination buffer 210 texture view (represented by the coordinates DEST_X and DEST_Y) and the source texture pixel (and sample) locations (represented by the coordinates SOURCE_TEX_X and SOURCE_TEX_Y).

In some embodiments, the remapping equations are as follows:

SOURCE_TEX_$X$=DEST_$X$/SAMPLE_COUNT;

SOURCE_TEX_Y=DEST_Y; and

SOURCE_SAMPLE_NUMBER=DEST_X % SAMPLE_COUNT

[Note that the '/' symbol above represents the result of performing an integral division, and the '%' symbol above represents the remainder from performing an integral division.]

As shown in FIG. 2, evaluating the remapping equations using exemplary destination pixel PIX (4,2), having DEST_X value of 4 and DEST_Y value of 2, as well as the value of 4 for SAMPLE COUNT (since this is an MSAA 4× texture example), results in a SOURCE_TEX_X value of 1, a SOURCE_TEX_Y value of 2, and a SOURCE_SAMPLE_NUMBER value of 0, meaning that the source texture memory should be accessed at Pixel (1,2) and sample S0. As shown by spatial relationship 225, this is indeed the source texture sample that corresponds to position PIX (4,2) in the destination buffer 210 texture view.

As mentioned above, another limitation of some GPU hardware is that there is a limited maximum row stride and/or texture size. In some such cases, the row stride may be exceeding when 'unrolling' the individual samples from a row of the source texture into the destination buffer texture view. Referring now to FIG. 3A, an attempt to horizontally unroll a 4× multisampled, 6,000 pixel by 100 pixel source texture 300 into a texture view of a destination buffer 302 is illustrated, in accordance with one or more embodiments. In this example, the destination buffer texture view would be required to have 6,000*4, or 24,000, pixel samples across each row. However, there is a maximum texture row stride 304 in this case that is set at 16,384 pixels, which would clearly be exceeded if a simple horizontal unrolling approach were taken, e.g., in an attempt to maintain the spatial relationship between the source texture and the destination buffer texture view. [Of course, if the source texture were smaller, e.g., a 4× multisampled, 3,000 pixel by 100 pixel source texture 310, then the maximum texture row stride 314 of the destination buffer texture view 312 may be sufficient for the simple horizontal unrolling approach to work, i.e., because (4*3,000)=12,000, which is less than the maximum 16,384 texture row stride 314.]

As may now be more clearly understood, the horizontal unrolling approach may only work so long as W*N<MaxTextureSize, wherein W is the width of the source texture, N is the sample count for each pixel, and MaxTextureSize is the maximum allowable texture size (and/or row stride, in the case linear layouts) in the destination buffer. Thus, according to some embodiments disclosed herein, when the destination buffer is too large to be aliased by an equivalent non-MSAA texture view, the GPU driver may instruct the GPU to try to alias the destination buffer with a texture view that has a number of pixels equal to the number of samples of the destination buffer. However, because of the maximum texture size limits, the stride of the destination view may no longer bear any spatial relationship with the source texture. Thus, to access the source texture correctly, a remapping algorithm according to some embodiments disclosed herein may be used to determine the so-called 'linear sample index' of each fragment within the view (i.e., which number sample it is in a global linear list of samples ranging from 0 to NumSamples-1) and then use the actual destination stride to compute the texture coordinates used to sample the source texture.

Figure 3B:
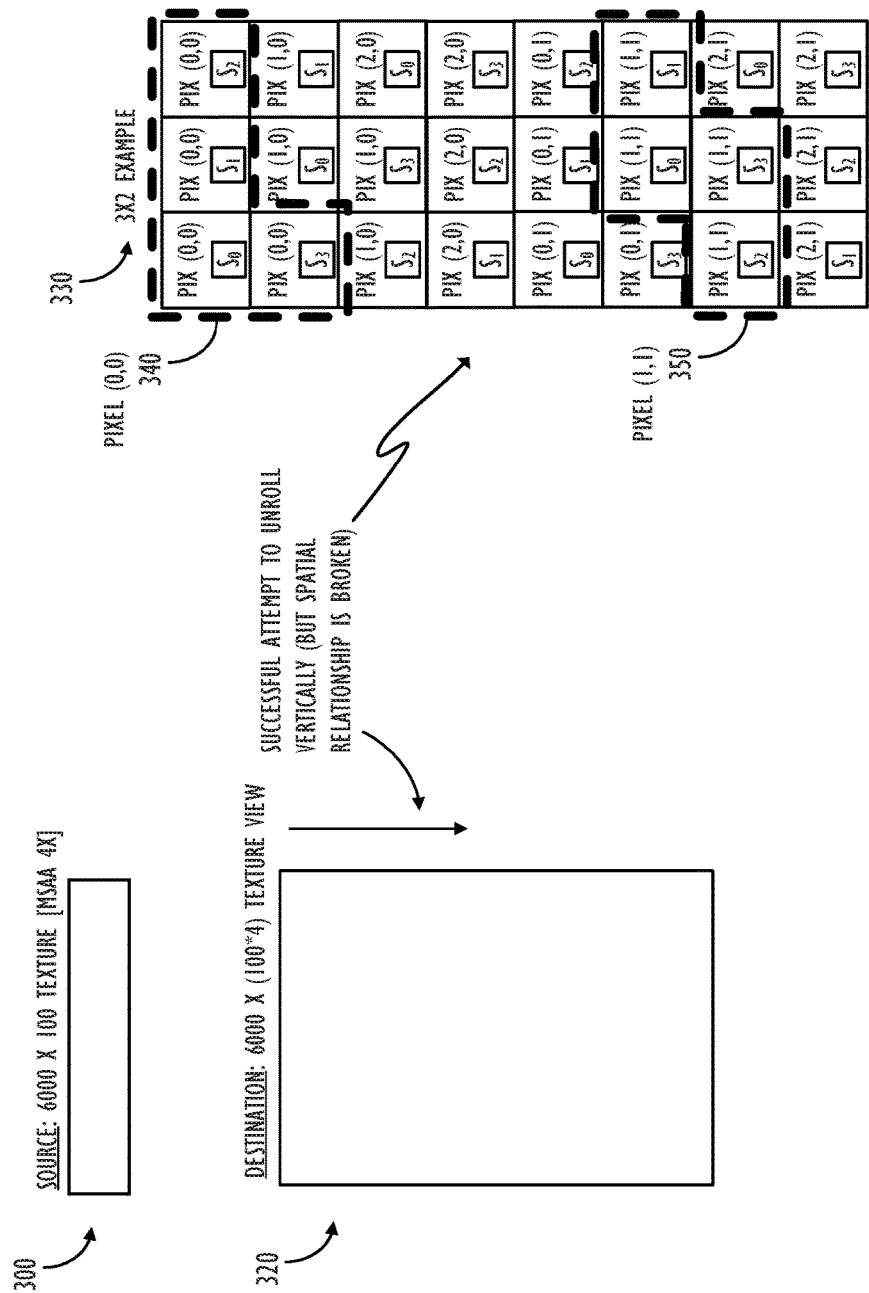
FIG. 3B illustrates an attempt to unroll a multisampled source texture vertically into a texture view of a destination buffer, in accordance with one or more embodiments.

Referring now to FIG. 3B, an attempt to vertically unroll the 4× multisampled, 6,000 pixel by 100 pixel source texture 300 into a texture view of a destination buffer 320 is illustrated, in accordance with one or more embodiments. As shown in the context of the simple 3×2 pixel example 330 introduced in FIG. 2, the attempt to unroll the source texture vertically in the destination buffer texture view is successful (in the sense that it does not exceed the maximum texture size and/or row stride), but the spatial relationship between the source texture and the destination texture view is broken. In particular, it is noted that the four samples of pixel (0,0) 340 span the entire top row of the destination texture view, as well as the left-hand edge of a second row of the destination texture view. Likewise, the four samples of pixel (1,1) 350 span two different rows. Thus, according to some embodiments, a remapping algorithm may be used to calculate the corresponding source texture coordinates (and sample number) from the particular coordinates of a sample in the destination buffer texture view.

Figure 4:
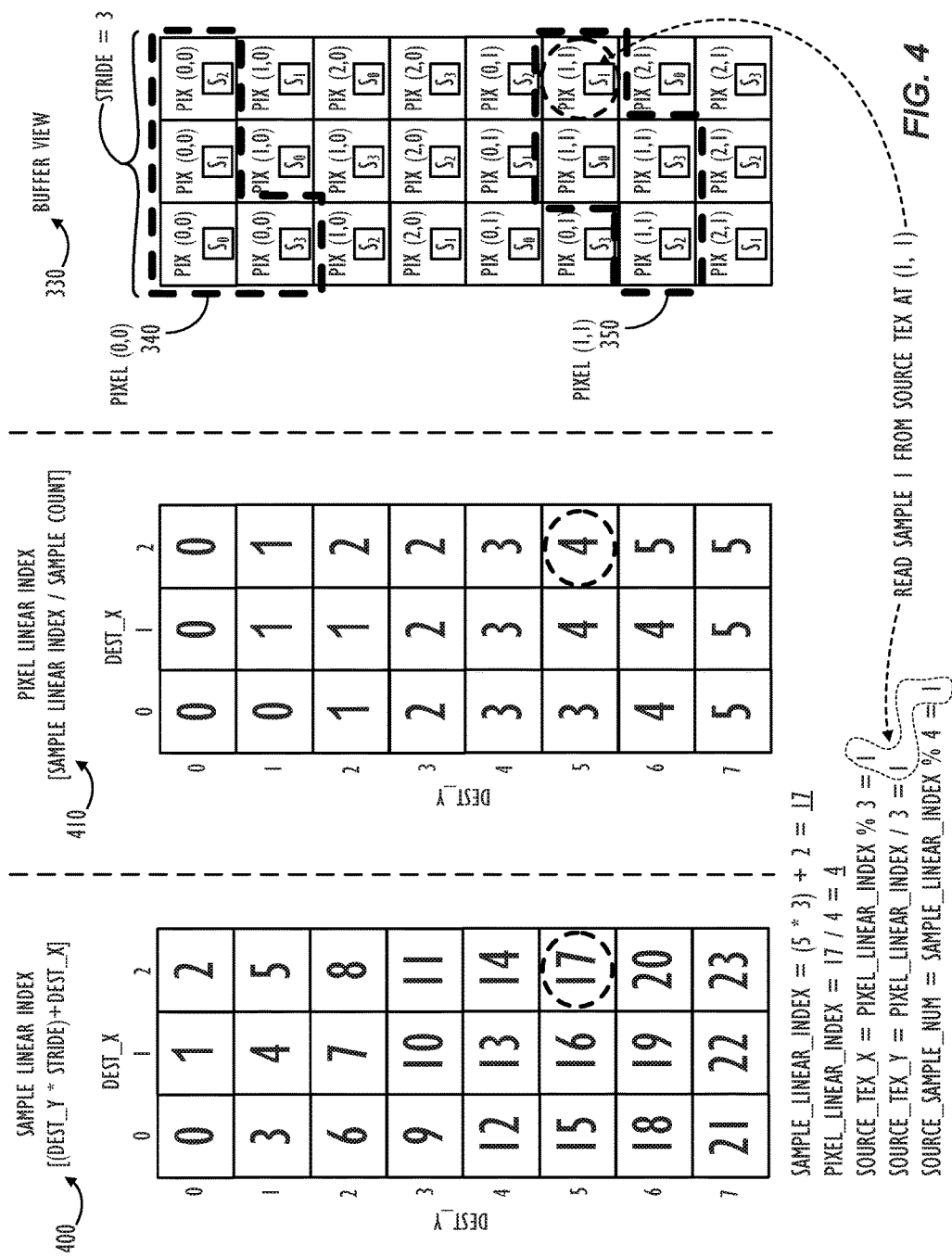
FIG. 4 illustrates the relationship between the sample linear index, the pixel linear index, and the corresponding row and column location of a particular sample in a destination buffer view of a texture, in accordance with one or more embodiments.

Referring now to FIG. 4, the relationship between the sample linear index 400, the pixel linear index 410, and the corresponding row and column location of a particular sample in a destination buffer texture view 330 is illustrated, in accordance with one or more embodiments. As shown in left table of FIG. 4, the sample linear index 400 within a destination buffer texture view may be calculated according to the equation: (DEST_Y*STRIDE)+DEST_X. In the example shown in FIG. 4, the sample at location DEST_X=2 and DEST_Y=5 has been selected from the destination buffer texture view, as indicated by the dashed line circle around the selected sample in each table view. Plugging in the values results in a sample linear index of: (5*3)+2=17. In other words, the sample being copied from the source texture in this example is the seventeenth sample in linear sequence in the destination buffer. Next, as shown in middle table of FIG. 4, the pixel linear index 410 within a destination buffer texture view may be calculated according to the equation: (SAMPLE_LINEAR_INDEX/SAMPLE_COUNT). In the example shown in FIG. 4, the sample at location DEST_X=2 and DEST_Y=5 was determined to be sample linear index 17, and the sample count per pixel is 4, so the equation evaluates to: 17/4=4. In other words, the sample being copied from the source texture in this example is part of the fifth overall pixel in the source texture (since the pixel index in this example starts at zero). Finally, as shown in right table of FIG. 4, the source texture coordinates corresponding to a particular sample within a destination buffer texture view 330 may be calculated according to the following equations:

SOURCE_TEX_X=PIXEL_LINEAR_INDEX % BUFFER_STRIDE

SOURCE_TEX_$Y$=PIXEL_LINEAR_INDEX/BUFFER_STRIDE

SOURCE_TEX_X=SAMPLE_LINEAR_INDEX % SAMPLE_COUNT

In the example shown in FIG. 4, the sample at location DEST_X=2 and DEST_Y=5 was determined to be sample linear index 17 and pixel linear index 4; the buffer stride is 3; and the sample count per pixel is 4. Thus, as shown in FIG. 4, the three equations outlined above each evaluate to a value of 1. Thus, the seventeenth sample in the destination buffer (located at row=5, column=2 in the destination texture view) should be read from the source texture at sample S1 of pixel (1,1). The equations above may be used to similarly map between any sample in the destination texture view and the corresponding sample in the source texture. According to some embodiments, the remapping equations above may be implemented using fragment shader programs.

Figure 5:
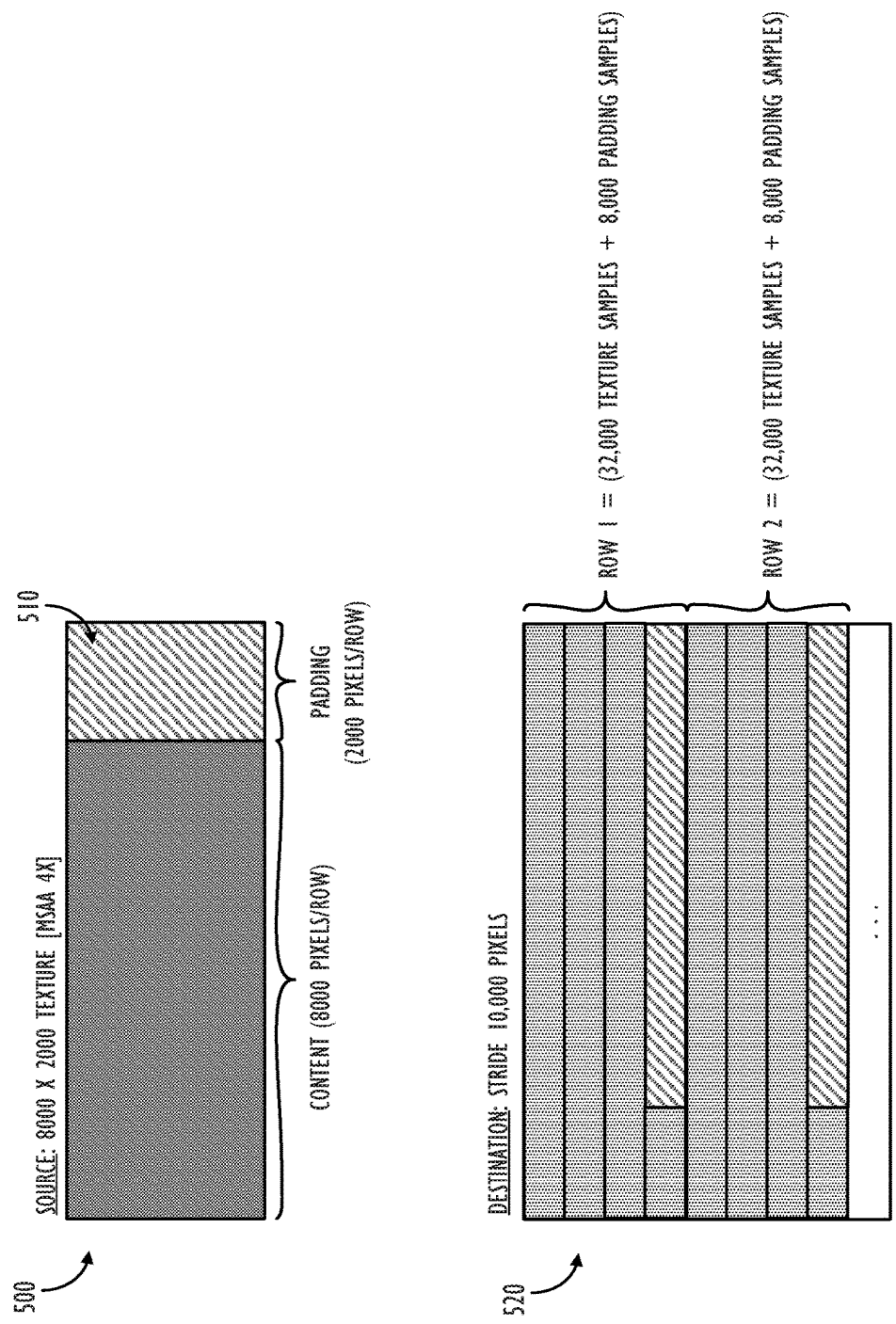
FIG. 5 illustrates the use of a remapping algorithm when the source texture contains designated padding space, in accordance with one or more embodiments.

Referring now to FIG. 5, the use of a remapping algorithm when the source texture 500 contains designated padding space 510 is illustrated, in accordance with one or more embodiments. When the destination texture has a non-zero stride padding and W*N>MaxTextureSize, the per-row stride padding portions of the buffer will become interleaved with the content pixels within the destination buffer texture view. This means that the GPU may not simply skip the extra row padding pixels based on their location in the destination buffer texture view (as it could normally natively do in an efficient fashion, i.e., in a non re-mapped scenario), but, rather, it needs to identify the padding fragments and discard them manually to avoid impermissibly overwriting certain designated regions in memory. According to one embodiment, these fragments may be detected based, at least in part, on the fact that they are located at pixels of the source texture whose X coordinate is larger than the logical width of the buffer itself (i.e., the number of content pixels per row in the source texture), e.g., according to the following pseudocode:
(textureCoordX>bufferWidth)
  discard Pixel In the example shown in FIG. 5, the source texture 500 comprises an 8,000 by 2,000 MSAA 4× texture, which also contains 2,000 pixels of padding 510 per row. Thus, the source buffer comprises 10,000 pixel's worth of content in each row, with the first 8,000 pixels in each row containing image context, and the 2,000 pixels on the right-hand side of each row being designated as padding, i.e., pixels that are not to be accessed or displayed in the output texture. Because the source texture in this example is a MSAA 4× texture, when the pixel information is copied into a destination buffer texture view having a 10,000 pixel row stride, e.g., as shown in destination buffer texture view 520, each row of pixels will map to four rows of samples in the destination texture buffer view, i.e., 32,000 samples of pixel data (taking up more than 3 rows in the destination texture view), followed by 8,000 samples reflecting the padding pixels in the source texture (taking up four-fifths of every fourth row in the destination texture view). Note that, the reason why there are 8,000 padding samples (rather than 2,000) is because, according to some embodiments, the padding pixels are treated identically to context pixels from the source texture, e.g., in case the developer has placed some other important data in the padding.

Because the padding regions in the 'unrolled' version of the destination buffer texture view may no longer always be assumed to be located at the right-hand edge of the texture view, and instead may be interleaved at various locations throughout the texture view (as shown by the diagonally shaded regions in destination texture view 520), the GPU's native abilities to disregard padding at particular row locations may no longer be relied upon. Instead, as described above, the remapping equations may be utilized to determine the source texture X coordinate of the padding sample, and, if the determined source texture X coordinate is greater than the buffer width, discard the pixel. According to some embodiments, the discarding of the pixel may be implemented by leveraging the pixel's existing ability to execute a fragment discard command, effectively stopping the execution of the fragment shader for the particular pixel sample before that portion of the source texture data is written to the destination buffer.

Functionality implementing these remapping operations and allowing the aforementioned blit copy operations for multisampled textures may, e.g., be implemented in the METAL API by the MTLBlitCommand Encoder class and, in particular, the copyFromBuffer: . . . toTexture and copy-FromTexture: . . . toBuffer functions for copying data from a buffer to a texture (and vice versa), including multisampled textures.

Figure 6A:
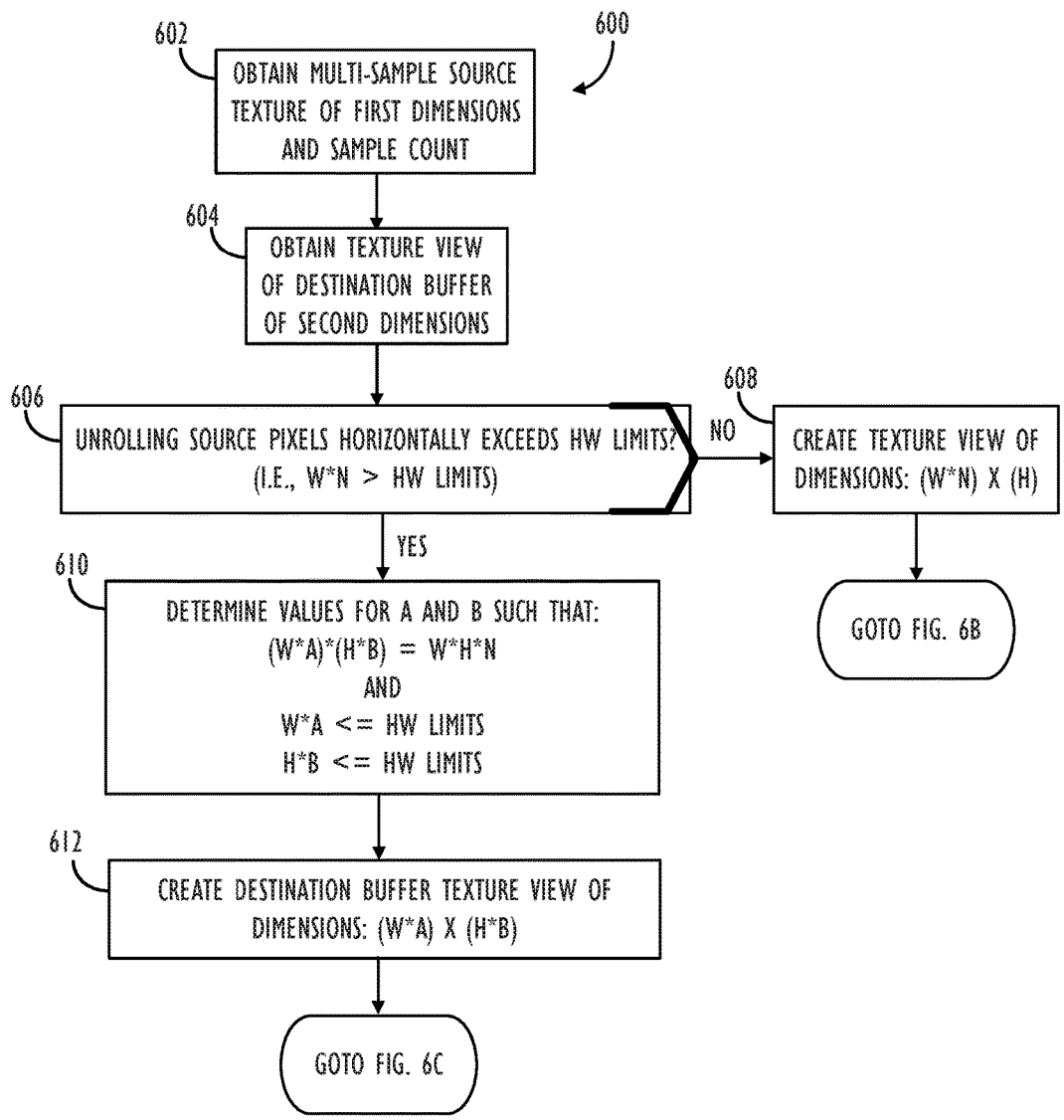
FIG. 6A illustrates, in flowchart form, a process of creating a destination buffer view for copying the contents of a multisampled source texture into, in accordance with one or more embodiments.

Referring now to FIG. 6A, a process 600 of creating a destination buffer view for copying the contents of a multisampled source texture into is illustrated in flowchart form, in accordance with one or more embodiments. First, the process may obtain a multisampled source texture having first dimensions (e.g., a first number of rows, H, and a second number of columns, W) and a first sample count, N (block 602). Next, the process may obtain a texture view of a destination buffer of second dimensions (e.g., a third number of rows and a fourth number of columns, wherein one or both of the third number of rows and the fourth number of columns are sized to be able to store each of the multiple samples for each of the pixels in the source texture in a single-sample-per-pixel layout) (block 604). Next, the process may determine whether, when the multisampled source texture is unrolled horizontally, the number of pixel samples in a row of the destination buffer texture view would exceed the hardware's limits, i.e., if the value of W*N would be larger than the hardware's maximum row stride limit (block 606). In some embodiments this determination may be performed by a CPU. If the number of pixel samples in a row of the destination buffer texture view would not exceed the hardware's limits (i.e., "NO" at block 606), the process may proceed to block 608 and create a destination texture view of dimensions (W*N)×H. In some embodiments, a CPU may program the GPU specially to perform the horizontal unrolling of block 608. Next, the process may proceed to the operation 630 illustrated in FIG. 6B. As discussed above, an MSAA 4× source texture unrolled horizontally would end up with a width that is four times as large in the destination texture after the horizontal unrolling process was completed, but the spatial relationship between the pixels in the source texture and their location in the destination buffer would remain intact. Thus, this scenario would not require the complex remapping processes described herein.

If, instead, the process 600 determines at block 606 that, when the multisampled source texture is unrolled horizontally, the number of pixel samples in a row the destination buffer texture view would exceed the hardware's limits (i.e., "YES" at block 606), the process may proceed to block 610 to determine dimensions of a destination buffer texture view that will be able to hold each of the samples of the multisampled source texture—without exceeding any of the hardware's limitations. Thus, at block 610, the process may determine values for variables 'A' and 'B,' such that (W*A)*(H*B) is equal to W*H*N, i.e., is equal to the total number of samples in the multisampled source texture, while maintaining that the value (W*A) is less than the hardware's limits for maximum row stride and the value (H*B) is less than the hardware's limits for maximum texture height. Once suitable values for A and B have been determined at block 610, the process may create a texture view of the destination buffer having the dimensions (W*A)×(H*B) (block 612). Next, the process may proceed to the operation 650 illustrated in FIG. 6C.

Figure 6B:
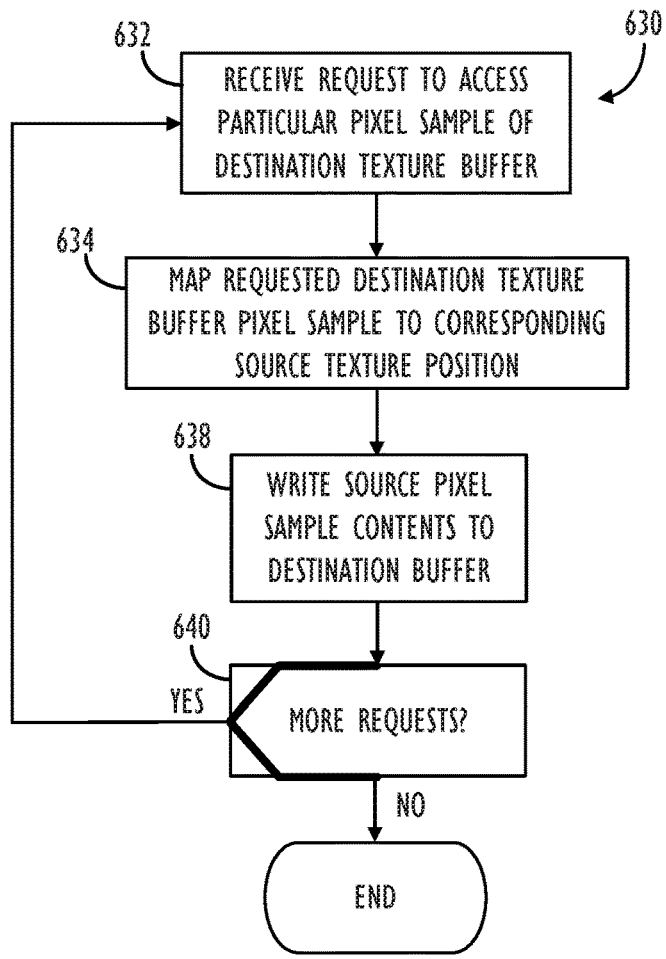
FIG. 6B illustrates, in flowchart form, a process of copying the contents of a multisampled source texture into a destination buffer view, in accordance with one or more embodiments.

Referring now to FIG. 6B, a process 630 of copying the contents of a multisampled source texture into a destination buffer view is illustrated in flowchart form, in accordance with one or more embodiments. First, the process may receive a request to access a particular pixel sample of the destination buffer texture view (block 632). Next, the process may use one or more remapping equations to determine the corresponding source texture position (and sample number) (block 634). Next, the process may proceed to block 638 and write the determined corresponding source pixel sample contents to the destination buffer at the corresponding location in memory. Next, the process may check to determine if there are any further requests access a particular sample of the destination texture buffer (block 640) and return to block 632 if the answer is "YES" at block 640. When there are no further requests to access a particular sample of the destination texture buffer at block 640, the process 630 may end.

Figure 6C:
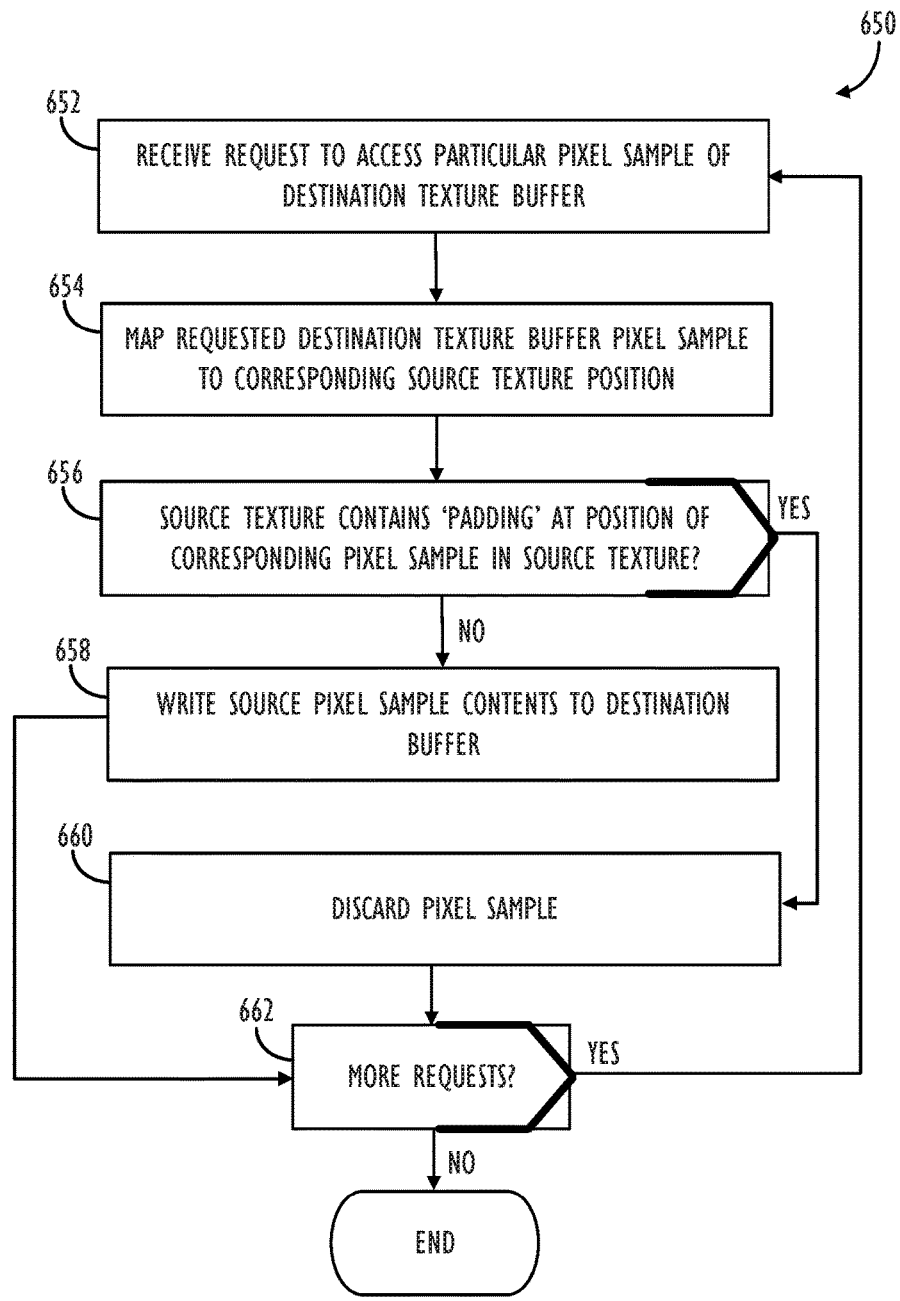
FIG. 6C illustrates, in flowchart form, a process of copying the contents of a multisampled source texture into a destination buffer view, in accordance with one or more embodiments.

Referring now to FIG. 6C, a process 650 of copying the contents of a multisampled source texture into a destination buffer view is illustrated in flowchart form, in accordance with one or more embodiments. First, the process may receive a request to access a particular pixel sample of the destination buffer texture view (block 652). Next, the process may use one or more re mapping equations to determine the corresponding source texture position (and sample number) (block 654). Next, the process may perform a mathematical check to determine if the source texture comprises padding at the determined corresponding source texture position (block 656). If the source texture comprises padding (i.e., "YES" at block 656), the process may proceed to block 660 and simply discard the current pixel sample (i.e., kill the fragment shader program associated with the pixel) and then check to determine if there are any further requests to map destination buffer samples to source texture positions (block 662) (returning to block 652 if the answer is "YES" at block 662). If, instead, the source texture does not comprise padding (i.e., "NO" at block 656), the process may proceed to block 658 and write the determined corresponding source pixel sample contents to the destination buffer at the corresponding location in memory. Next, the process may check to determine if there are any further requests to access a particular sample of the destination texture buffer (block 662) and return to block 652 if the answer is "YES" at block 662. When there are no further requests to access a particular sample of the destination texture buffer at block 662, the process 650 may end.

As may be understood, the processing capabilities of GPUs make them particularly well-suited to perform the above-described processes in a parallel fashion. In other words, a GPU may copy many pixels (having many samples) from many rows—all at the same time.

Figure 7:
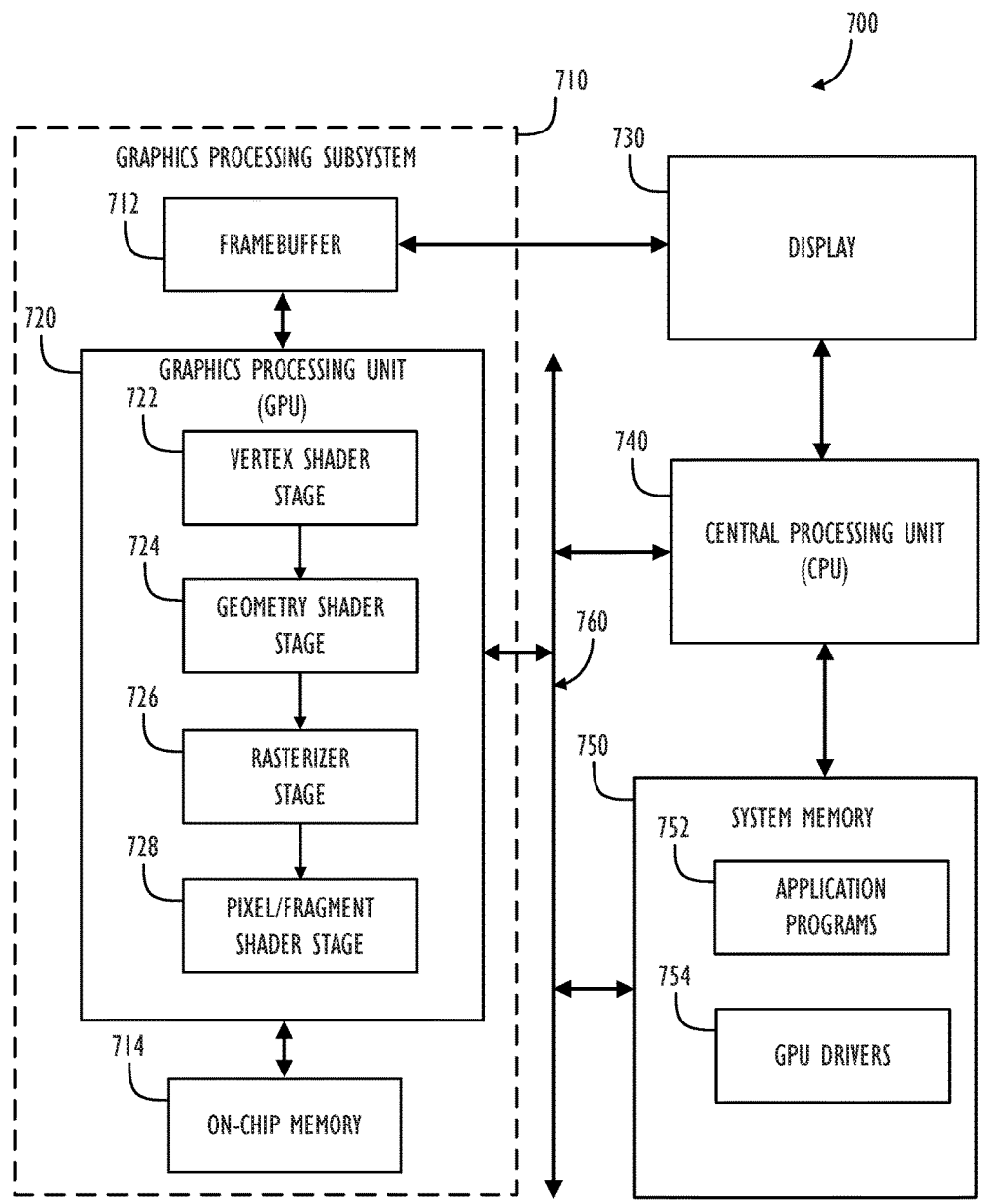
FIG. 7 shows, in block diagram form, a graphics processing system of a multi-function electronic device, in accordance with one embodiment.

Referring now to FIG. 7, a graphics processing system 710 of a multi-function electronic device 700 is illustrated in block diagram form, in accordance with one embodiment. Electronic device 700 could be, for example, a mobile telephone, personal media device, portable camera, or a tablet, notebook, or desktop computer system. As shown, electronic device 700 may include a central processing unit (CPU) 740, e.g., for carrying out or controlling the operation of many of the functions of electronic device 700. Electronic device 700 may also include system memory 750, which may, e.g., comprise memory dedicated to storing information related to various device functions, such as application programs 752 or GPU drivers 754. Application programs 752 may comprise programs (e.g., games or "Apps") that utilize GPU drivers 754 to create and/or display 2D and/or 3D graphics on a display 730 of electronic device 700 that is viewed and/or interacted with by a user of the electronic device. As shown, CPU 740 may be in communication, e.g., via a data bus 760 or the like, with one or more of the display 730, the system memory 750, and a graphics processing subsystem 710.

Graphics processing subsystem 710 may be made up of one or more graphics processing units (GPUs) 720 that may, e.g., be dedicated to graphics-oriented rendering tasks, such as tasks that lend themselves well to parallel processing on a plurality of fragments. Each GPU 720 may comprise one or more processing units that operate on pixel (i.e., fragment) data and/or vertex data in various stages. For example, common graphics rendering pipelines may comprise: a vertex shader stage (722); a geometry shader stage (724); a rasterizer stage (726); and a pixel/fragment shader stage (728). The vertex shader stage 722 may comprise a programmable shader stage in the rendering pipeline that handles the processing of individual vertices. The geometry shader stage 724 may comprise an optional programmable shader stage in the rendering pipeline that governs the processing of primitives. The rasterizer stage 726 may comprise stage in the rendering pipeline whereby each individual primitive is broken down into discrete elements called fragments, based on the sample coverage of the primitive. The pixel/fragment shader stage 728 may comprise a shader stage in the rendering pipeline that will process a fragment generated by the rasterizer stage 726, e.g., into a set of colors and a depth value. These color and depth values for individual pixels on the display are what may be written to a frame buffer 712 before being displayed on a display, e.g., display 730 of exemplary electronic device 700. Graphics processing subsystem 710 may also comprise on-chip memory 714 for performing the various functions described above.

Figure 8:
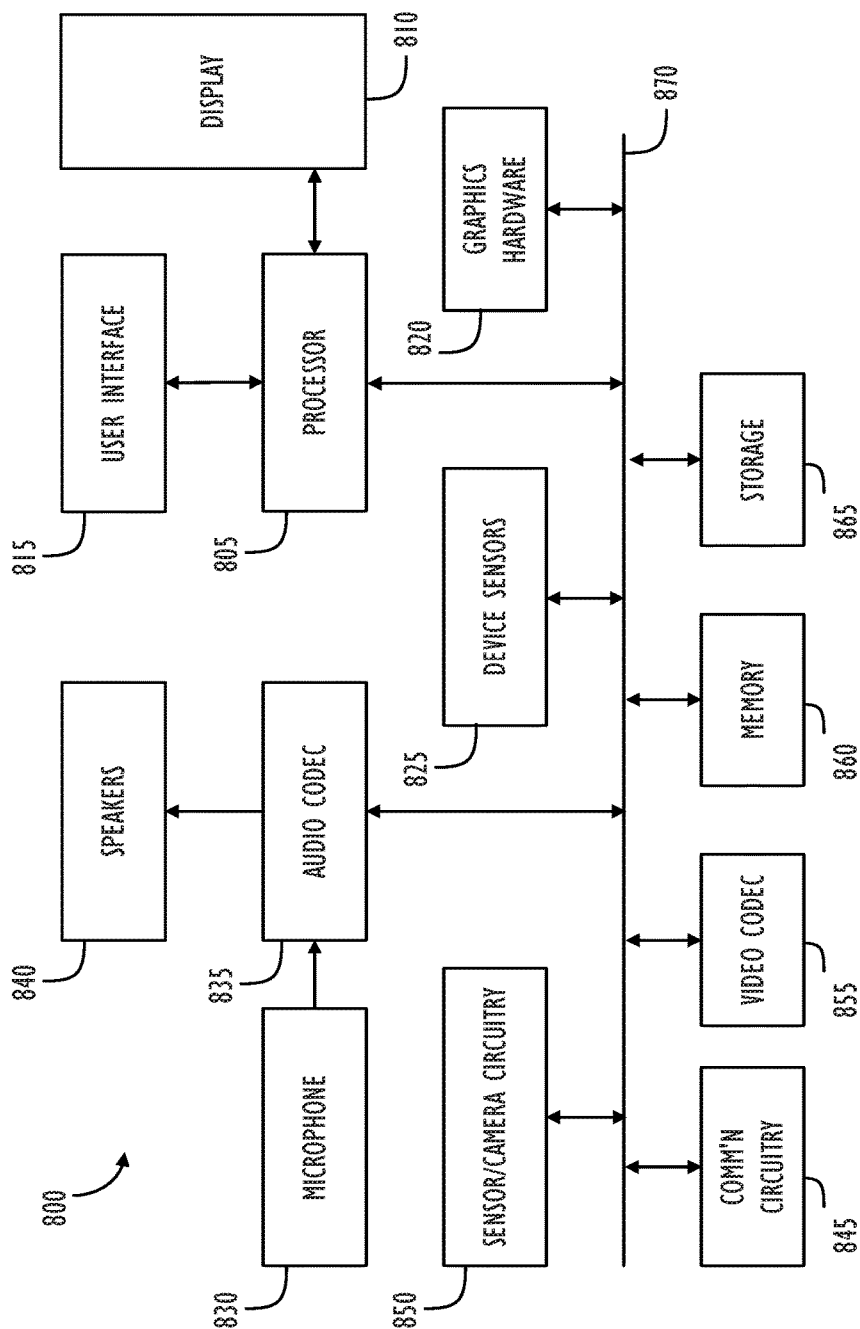
FIG. 8 shows, in block diagram form, a multi-function electronic device, in accordance with one embodiment.

Referring now to FIG. 8, a simplified functional block diagram of illustrative electronic device 800 is shown according to one embodiment. Electronic device 800 could be, for example, a mobile telephone, personal media device, portable camera, or a tablet, notebook, or desktop computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, video codec(s) 855, memory 860, storage 865, and communications bus 870.

Processor 805 may execute instructions necessary to carry out or control the operation of many functions performed by device 800 (e.g., such as the generation and/or processing of video image frames in accordance with the various embodiments described herein. Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may view a captured video stream and/or indicate particular frames) that the user would like to have a particular stabilization constraint(s) applied to (e.g., by clicking on a physical or virtual button at the moment the desired frame is being displayed on the device's display screen). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs).

Image capture circuitry 850 may capture video images that may be processed to generate stabilized video in accordance with this disclosure. Output from image capture circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). In one or more embodiments, one or more of the disclosed steps may be omitted, repeated, and/or performed in a different order than that described herein. Accordingly, the specific arrangement of steps or actions shown in FIGS. 6A-6C should not be construed as limiting the scope of the disclosed subject matter. The scope of the invention therefore should be determined with reference to the appended claims, along with the full scope of equivalents to which such claims are entitled.

The invention claimed is:

1. A non-transitory program storage device comprising instructions stored thereon to cause one or more processors to:
    determine that a number of samples in a first row of multisampled pixels in a source memory exceeds a maximum row stride of a destination memory, wherein the source memory comprises a two-dimensional memory buffer having a first number of rows of multisampled pixels and a second number of columns of multisampled pixels, wherein the multisampled pixels in the source memory are sampled using a first sample count, and wherein the destination memory comprises a one-dimensional memory buffer of pixel sample information; and
    in response to determining that the number of samples in the first row of multisampled pixels in the source memory exceeds the maximum row stride of the destination memory:
        create a texture view of the destination memory, wherein the texture view comprises a two-dimensional representation of the destination memory, the texture view having a third number of rows of pixel sample information and a fourth number of columns of pixel sample information, and wherein a row stride of the texture view equals the maximum row stride;
        determine that a first portion of the samples in the first row of multisampled pixels in the source memory corresponds to a first row of the texture view of the destination memory;
        determine that a second portion of the samples in the first row of multisampled pixels in the source memory corresponds to a second row of the texture view of the destination memory;
        write the first portion of the samples in the first row of multisampled pixels in the source memory to a location corresponding to the first row of the texture view of the destination memory; and
        write the second portion of the samples in the first row of multisampled pixels in the source memory to a location corresponding to the second row of the texture view of the destination memory, wherein a row number of the first row of multisampled pixels in the source memory is different than a row number of the second row of the texture view of the destination memory.

2. The non-transitory program storage device of claim 1, further comprising instructions stored thereon to cause the one or more processors to:
    determine that the first row of multisampled pixels in the source memory is followed by a padding region; and
    write the padding region in the second row of the texture view of the destination memory, after the second portion of the samples.

3. The non-transitory program storage device of claim 1, wherein the texture view comprises a linear memory layout.

4. The non-transitory program storage device of claim 1, wherein the first sample count comprises at least one of: 2, 4, 8, 16, and 32.

5. The non-transitory program storage device of claim 1, wherein the instructions to cause the one or more processors to create the texture view of the destination memory comprise instructions to cause the one or more processors to maintain a spatial relationship between the source memory and the texture view.

6. The non-transitory program storage device of claim 1, wherein the instructions to cause the one or more processors to determine that a second portion of the samples in the first row of multisampled pixels in the source memory corresponds to a second row of the texture view of the destination memory further comprise instructions to cause the one or more processors to:
    perform a mapping operation between the source memory and the texture view.

7. The non-transitory program storage device of claim 6, wherein the instructions to cause the one or more processors to perform a mapping operation between the source memory and the texture view comprise instructions to cause the one or more processors to perform the mapping operation based, at least in part, on:
the first sample count; and the maximum row stride.

8. A method for performing a mapping of a multisampled texture in memory, comprising:
determining that a number of samples in a first row of multisampled pixels in a source memory exceeds a maximum row stride of a destination memory, wherein the source memory comprises a two-dimensional memory buffer having a first number of rows of multisampled pixels and a second number of columns of multisampled pixels, wherein the multisampled pixels in the source memory are sampled using a first sample count, and wherein the destination memory comprises a one-dimensional memory buffer of pixel sample information; and
in response to determining that the number of samples in the first row of multisampled pixels in the source memory exceeds the maximum row stride of the destination memory:
creating a texture view of the destination memory, wherein the texture view comprises a two-dimensional representation of the destination memory, the texture view having a third number of rows of pixel sample information and a fourth number of columns of pixel sample information, and wherein a row stride of the texture view equals the maximum row stride;
determining that a first portion of the samples in the first row of multisampled pixels in the source memory corresponds to a first row of the texture view of the destination memory;
determining that a second portion of the samples in the first row of multisampled pixels in the source memory corresponds to a second row of the texture view of the destination memory;
writing the first portion of the samples in the first row of multisampled pixels in the source memory to a location corresponding to the first row of the texture view of the destination memory; and
writing the second portion of the samples in the first row of multisampled pixels in the source memory to a location corresponding to the second row of the texture view of the destination memory, wherein a row number of the first row of multisampled pixels in the source memory is different than a row number of the second row of the texture view of the destination memory.

9. The method of claim 8, further comprising:
determining that the first row of multisampled pixels in the source memory is followed by a padding region; and
writing the padding region in the second row of the texture view of the destination memory, after the second portion of the samples.

10. The method of claim 8, wherein the texture view comprises a linear memory layout.

11. The method of claim 8, wherein the first sample count comprises at least one of: 2, 4, 8, 16, and 32.

12. The method of claim 8, wherein:
creating the texture view of the destination memory comprises maintaining a spatial relationship between the source memory and the texture view.

13. The method of claim 8, wherein:
determining that a second portion of the samples in the first row of multisampled pixels in the source memory corresponds to a second row of the texture view of the destination memory further comprises performing a mapping operation between the source memory and the texture view.

14. An electronic device, comprising:
one or more memory units;
one or more processors operatively coupled to the one or more memory units configured to execute instructions causing the one or more processors to:
determine that a number of samples in a first row of multisampled pixels in a source memory exceeds a maximum row stride of a destination memory, wherein the source memory comprises a two-dimensional memory buffer having a first number of rows of multisampled pixels and a second number of columns of multisampled pixels, wherein the multisampled pixels in the source memory are sampled using a first sample count, and wherein the destination memory comprises a one-dimensional memory buffer of pixel sample information; and
in response to determining that the number of samples in the first row of multisampled pixels in the source memory exceeds the maximum row stride of the destination memory:
create a texture view of the destination memory, wherein the texture view comprises a two-dimensional representation of the destination memory, the texture view having a third number of rows of pixel sample information and a fourth number of columns of pixel sample information, and wherein a row stride of the texture view equals the maximum row stride;
determine that a first portion of the samples in the first row of multisampled pixels in the source memory corresponds to a first row of the texture view of the destination memory;
determine that a second portion of the samples in the first row of multisampled pixels in the source memory corresponds to a second row of the texture view of the destination memory;
write the first portion of the samples in the first row of multisampled pixels in the source memory to a location corresponding to the first row of the texture view of the destination memory; and
write the second portion of the samples in the first row of multisampled pixels in the source memory to a location corresponding to the second row of the texture view of the destination memory, wherein a row number of the first row of multisampled pixels in the source memory is different than a row number of the second row of the texture view of the destination memory.

15. The electronic device of claim 14, wherein the one or more processors are further configured to execute instructions to cause the one or more processors to:
determine that the first row of multisampled pixels in the source memory is followed by a padding region; and
write the padding region in the second row of the texture view of the destination memory, after the second portion of the samples.

16. The electronic device of claim 14, wherein the texture view comprises a linear memory layout.

17. The electronic device of claim 14, wherein the first sample count comprises at least one of: 2, 4, 8, 16, and 32.

18. The electronic device of claim 14, wherein the instructions for causing the one or more processors to create the texture view of the destination memory comprise instructions for causing the one or more processors to maintain a spatial relationship between the source memory and the texture view.

19. The electronic device of claim 14, wherein the instructions for causing the one or more processors to determine that a second portion of the samples in the first row of multisampled pixels in the source memory corresponds to a second row of the texture view of the destination memory further comprise instructions for causing the one or more processors to:

perform a mapping operation between the source memory and the texture view.

20. The electronic device of claim 19, wherein the instructions for causing the one or more processors to perform a mapping operation between the source memory and the texture view comprise instructions for causing the one or more processors to perform the mapping operation based, at least in part, on:

the first sample count; and the maximum row stride.

* * * * *